July 23, 1940.　　　　L. P. MONGAN　　　　2,208,852
ELECTRIC PRODDER
Filed Feb. 16, 1939　　　2 Sheets-Sheet 1
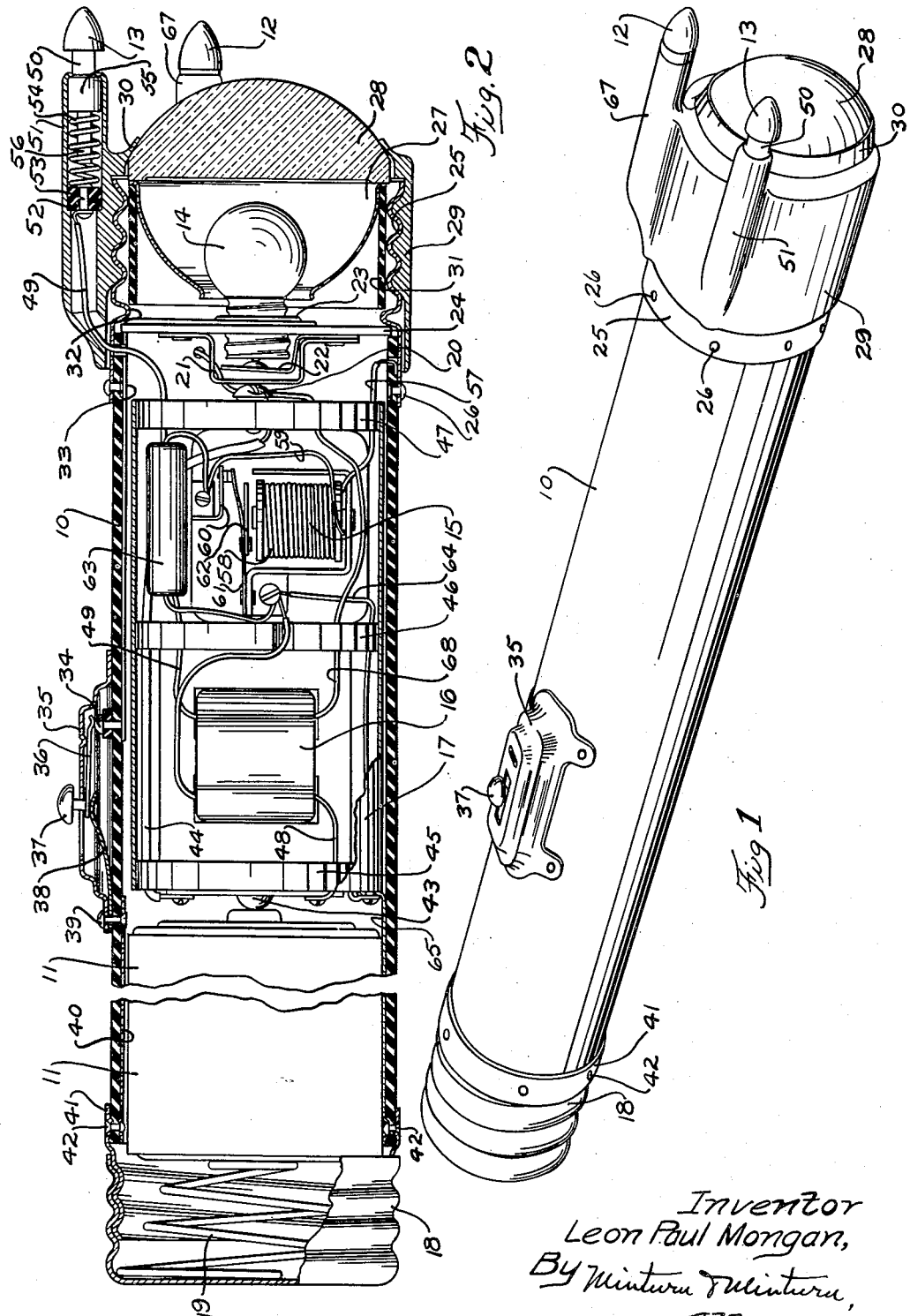
Inventor
Leon Paul Mongan,
By Minturn & Minturn,
Attorneys July 23, 1940.  L. P. MONGAN  2,208,852
ELECTRIC PRODDER
Filed Feb. 16, 1939  2 Sheets-Sheet 2

Inventor
Leon Paul Mongan,
By Minturn & Minturn,
Attorneys

Patented July 23, 1940

2,208,852

UNITED STATES PATENT OFFICE 2,208,852

ELECTRIC PRODDER

Leon Paul Mongan, near Indianapolis, Ind.

Application February 16, 1939, Serial No. 256,671

2 Claims. (Cl. 231—2)

This invention relates to means for prodding animals in such manner that no injury to the animal will be occasioned but at the same time induce the animal to move, such as in loading it into trucks for transport or about yards.

In handling live stock, considerable difficulty is generally occasioned in getting the animals into motion, particularly up a loading chute. Beating the animals with sticks or clubs generally does not help the situation but only inflicts bruises that result in inferior carcasses when the animals are dressed at the packing plant. Also it is quite a general practice to load animals in the dark in order to get early delivery at the stockyard or packing plants in time for the morning market so that some type of illumination is required during the loading process.

It is an important object of my invention to provide a prodding device of an electrical nature which will not only electrically shock the animals upon contact therewith but will provide a source of illumination along with the prodding device as a means of directing that device in applying it to the animal.

A further important object of the invention is to provide a very simple structure, compact in nature and one that will be free from mechanical and electrical troubles. A still further important object of the invention is to provide a device that has exposed electrical terminals for shocking the animals operable only upon contact with the animals independently of manually controlled switches.

Figure 3:
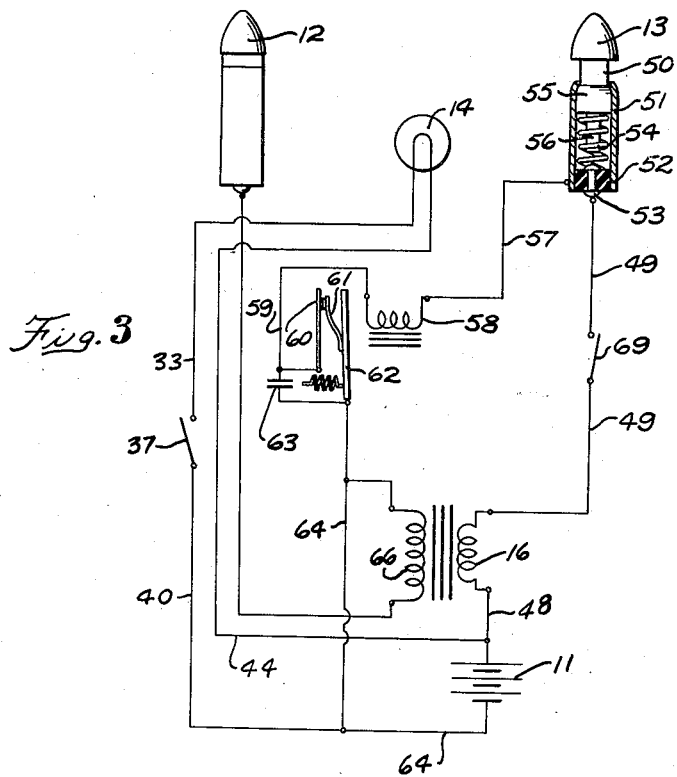

These and other objects and advantages of the invention will become apparent to those versed in the art in the following description as illustrated by the accompanying drawings, in which Fig. 1 is a side view in perspective of a structure embodying the invention;

Fig. 2, a central longitudinal section on an enlarged scale;

Fig. 3, a wiring diagram; and

Figure 4:
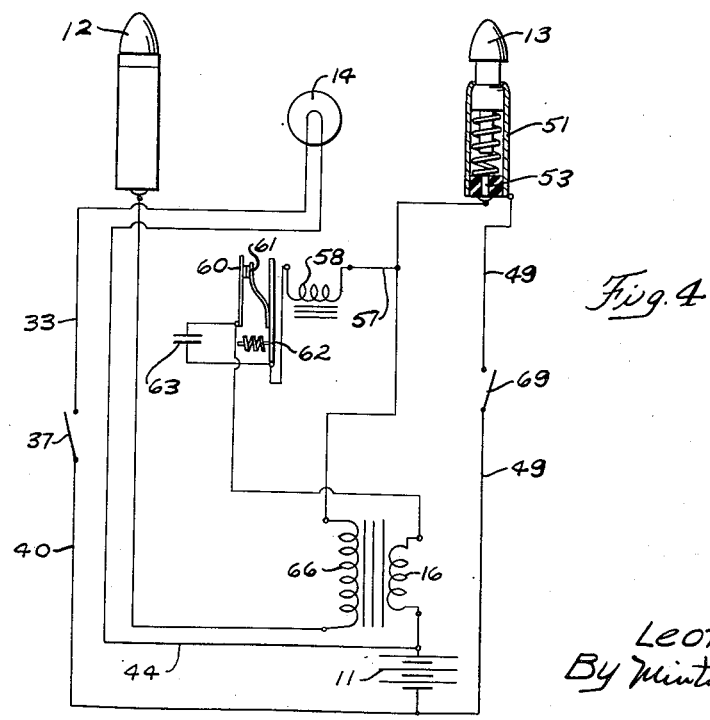

Fig. 4, a modified form of wiring diagram.

Like characters of reference indicate like parts throughout the several views in the drawings.

A tubular body 10, herein shown as having a wall made of electrical insulation, carries, in general, a number of dry cells 11, some means for producing a pulsating current, external electric terminals 12 and 13, and a lamp 14 arranged to throw a beam of light starting in close proximity to those terminals. The number of cells 11 may vary with the amount of current required, three being generally sufficient. The means for producing the pulsating current is preferably a vibrating mechanism which uses a very small amount of current and which rapidly makes and breaks an electric circuit to set up the pulsation therein.

In general current is taken from the dry cells 11 at the low voltage and broken up into a pulsating current by a vibrator 15. The pulsating current is sent through a transformer 16 to induce a higher voltage than that obtained directly from the dry cells 11. The induced current will, of course, also be of a pulsating nature and this current is conducted to the respective terminals 12 and 13 so that the high voltage circuit is completed by interconnecting these two terminals, this being done in practice by placing both terminals against the skin of the animal whereupon the higher voltage will send the current across the part of the animal between these two terminals to complete the circuit and thereby produce the desired shock in the animal.

Preferably the vibrator 15 and the transformer 16 are carried within a cartridge 17 that may be loosely entered into the tube 10 and pushed to its forward end so that the dry cells 11 may be inserted in the tube therebehind and the tube then closed at its rear end by means of a cap 18 carrying a spring 19 bearing between the cap and the back end of the lowest dry cell 11, thereby urging the cells and the cartridge 17 forwardly in the tube 10.

The forward travel of the cartridge 17 is limited by an electric terminal 20 carried on the end of the cartridge contacting a metallic lamp terminal member 21 which carries the metallic spring 22 against which the central base contact of the lamp 14 bears when the lamp is inserted in its socket 23. The member 21 and the base 23 are carried by an insulating disk 24 covering over the outer end of the tube 10. This disk 24 is retained in position by being pressed inwardly against the end of the tube 10 past the threads of a ferrule 25 which has its inner end telescoped over the outer end of the tube 10 and anchored in place by any suitable means such as by the rivets 26.

A reflector 27 is inserted in the outer end of the ferrule 25; a lens 28 placed thereover and a retaining head 29 having a lens engaging flange 30 is screw-threadedly telescoped over the ferrule 25 and turned back snugly until the flange 30 comes up snugly against the lens 28 into seating relation. This seating relation is obtained when the lens 28 presses the outer flanged end of the reflector 27 against the outer end of a tubular insulating sleeve 31 to carry that sleeve inwardly to have its inner end abut a rib 32 extending annularly around the inside of the ferrule 25, and under which rib the disk 24 is positioned.

From the lamp socket 23 is carried a conductor 33 downwardly inside of the tube 10 to a terminal rivet 34 which extends through the wall of the tube 10 to serve as a switch terminal externally of the tube. A switch housing 35 is secured to the tube 10 and carries a slide 36 therebetween having an operating button 37 extending by a shank through a slide in the housing 35. A spring member 38 is secured by one end to the tube 10 by a rivet 39 to have a free end turned into the path of the slide 36 so that when the slide 36 is pushed to the position as indicated in Fig. 2, an electrical circuit is closed between the rivet 34 through the slide 36 and spring member 38 to the rivet 39. From the rivet 39 leads a metallic conductor 40 down the inside of the tube 10 to connect with the metallic ferrule 41 secured to the rear end of the tube 10 in any suitable manner such as by the rivets 42. This screw ferrule 41 screw-threadedly carries the cap 18. Therefore, the electric circuit continues from the rivet 39 through the conductor 40, rivet 42, ferrule 41, cap 18, and spring 19 to the zinc shell of the dry cell 11 in contact with the spring 19.

The rear end of the cartridge 17 carries a central terminal 43 compressibly bearing against the central terminal of the dry cell 11 pressed toward the cartridge. From this central terminal 43 leads a conductor 44 up through the cartridge to interconnect with the other end terminal 20 above referred to, to complete the electric circuit between the dry cells and the lamp 14 through the switch as operated by the external button 37.

The transformer 16 is mounted in any suitable manner within the cartridge 17, herein shown as between two insulating disks 45 and 46. The vibrator 15 is mounted between the disk 46 and the outer end disk 47.

Referring to the wiring diagram shown in Fig. 3 as well as to the mechanical structure shown in Fig. 2, the primary winding of the transformer 16 is interconnected with the dry cells 11 through the rear terminal 43 by means of the wire 48 and the terminal 13 by means of the wire 49. However, it is well to know the structure of the terminal 13 in that the terminal is normally automatically disconnected from connection with the wire 49. The terminal 13 consists of an external button carried on the outer end of a shank 50 slidingly passing through an opening in the end of a tubular extension 51 carried by the head 29. An insulating member 52 carries a rivet 53 to which the wire 49 is attached. A spring 54 bears against this insulating member removed from contact with the rivet 53 by one end and by the other end presses against a shoulder provided on the terminal 13 within the tubular extension 51, this shoulder being about the inner end of a head 55 slidably guided within the extension 51 and confined therein by reason of the restricted opening through which the shank 50 travels. A post 56 extends inwardly from the head 55 to terminate a slight distance away from the rivet 53 so as to be normally out of contact therewith. When the terminal 13 is pushed inwardly to compress the spring 54, the end of the post 56 is brought into contact with the terminal rivet 53 and a circuit is thereby closed between the rivet 53 and the metallic extension 51.

From the metallic head 29 which, in the present form, integrally carries the metallic extension 51, leads a wire 57 to the coil 58 of the vibrator 15. It is to be noted that, Fig. 2, the wire 57 is actually connected with the ferrule 25 which in turn is in electrical connection with the head 29 through the metallic screw-threads.

From the other terminal of the winding 58 is carried the wire 59 to a fixed contact member 60 against which the contact member 61 mounted on the vibrator armature 62 normally bears. In order to prevent undue arcing a condenser 63 is connected across the contact members 60 and 61. From the armature 62 leads the conductor 64 back to complete the circuit with the dry cells 11. As indicated in Fig. 2, this conductor 64 extends through the rear end of the cartridge 17 and is interconnected with a conductor 65 running rearwardly therefrom inside of the tube 10 back to connect with the ferrule 41. Thus the circuit has been completed through the vibrator 15 and is energized by pushing inwardly the terminal 13. The two contact members 60 and 61 thereupon rapidly open and close automatically as long as the terminal 13 is held in its inner circuit closing position. The pulsating current thus set up flows through the primary winding of the transformer 16 and thereby tends to induce a current in the secondary winding 66 of the transformer. The terminals of this secondary transformer winding 66 are interconnected with the two terminals 12 and 13. The terminal 12 is carried in an insulating manner by its head extension 67 to receive the connecting wire 68 leading from one of the terminals of the winding 66. The other terminal interconnects with the wire 64 and thus through the condenser 63, wire 59, winding 58, and wire 57 to the head extension 51 and consequently the terminal 13. By carrying the capacity of the condenser 63, the intensity of the discharge between the two electrodes 12 and 13 may be controlled.

As indicated in the diagram, Fig. 3, the primary circuit may be further controlled by interposing a switch 69 in the wire 49 to be manually controlled if so desired. However, it is difficult to close this switch 69 at the time of applying the terminals 12 and 13 to the animal so as to get the timing right without causing the current to flow an undue length of time, and particularly to have the current flowing upon the instant of contact of these terminals with the animal. Therefore, while it is possible to so control the circuit, it is preferable to omit the switch 69 and rely entirely upon the switching action provided by the shiftable terminal 13 as above decribed. This is preferable since current is flowing from the dry cells 11 only at the instant of contact of the two terminals with the animal and is automatically stopped upon removal. It is to be kept in mind that this removal is rapidly achieved since the animal instantly jumps into action when he feels the effects of the electric current.

The lamp 14 is preferably controlled by the manually operated switch button 36 since the lamp would not be required where the light is sufficient but is only used in darkness, but in such use it is highly desirable since it directs a beam directly at the spot on the animal on which the terminals 12 and 13 are to be applied. In other words, by throwing the beam of light on the animal, the prodder may be applied by following that beam without loss of time or misapplication.

The wiring diagram illustrated in Fig. 4 is modified somewhat from that shown in Fig. 3 in that the secondary winding 66 is directly connected to the terminal 12 and the contacting rivet 53 at the terminal 13. The wire 49 is connected to the head extension 51 and the wire 57 is connected with the terminal member 53. This modified form utilizes the current induced in the secondary winding 66 without passing it through the condenser 63, otherwise the functioning is the same.

While I have herein shown and described my invention in the one form as now best known to me, it is obvious that the structure may be varied without departing from the spirit of the invention and I, therefore, do not desire to be limited to that precise form beyond the limitations as may be imposed by the following claims.

I claim:

1. In an electric prodder having means for producing a high voltage pulsating current, a lamp, and a housing, the combination with a head supported by the housing about said lamp, of a pair of spaced apart electrodes, extending from the head, a tubular member carried by the head, one of said electrodes being slidingly carried by said tubular member to be longitudinally reciprocable therein, spring means carried by the tubular member normally urging said one electrode to an extended position, an electrical contact behind said one electrode against which contact the electrode may be urged in resistance to said spring means, means insulating said contact from said tubular member, and means placing said contact and said electrode in a circuit carrying said pulsating current.

2. A new article of manufacture comprising a prodder head for an electric flash lamp, said head consisting of a cylindrical band internally screw-threaded, an inturned flange around its outer end serving as a lens retaining means, a pair of spaced apart posts extending outwardly from the band in substantial parallelism with the axis of the band, one of said posts at least being hollow and having an annular shoulder therein spaced from its outer end, an insulating block seated against said shoulder, a contact member through the block, an electrode entering said hollow posts, a spring between said block and said electrode, means limiting outward travel of the electrode, said spring having an inner end removed from electrical circuit with said contact member, said electrode being formed to abut said contact member when its outer end is pushed to overcome said spring, and said hollow post having a passageway leading from behind said block to carry an electrical conductor.

LEON PAUL MONGAN.